J. F. WOOD, 2nd.
Carriage-Brake.
No 42,711.
Patented May 10, 1864.
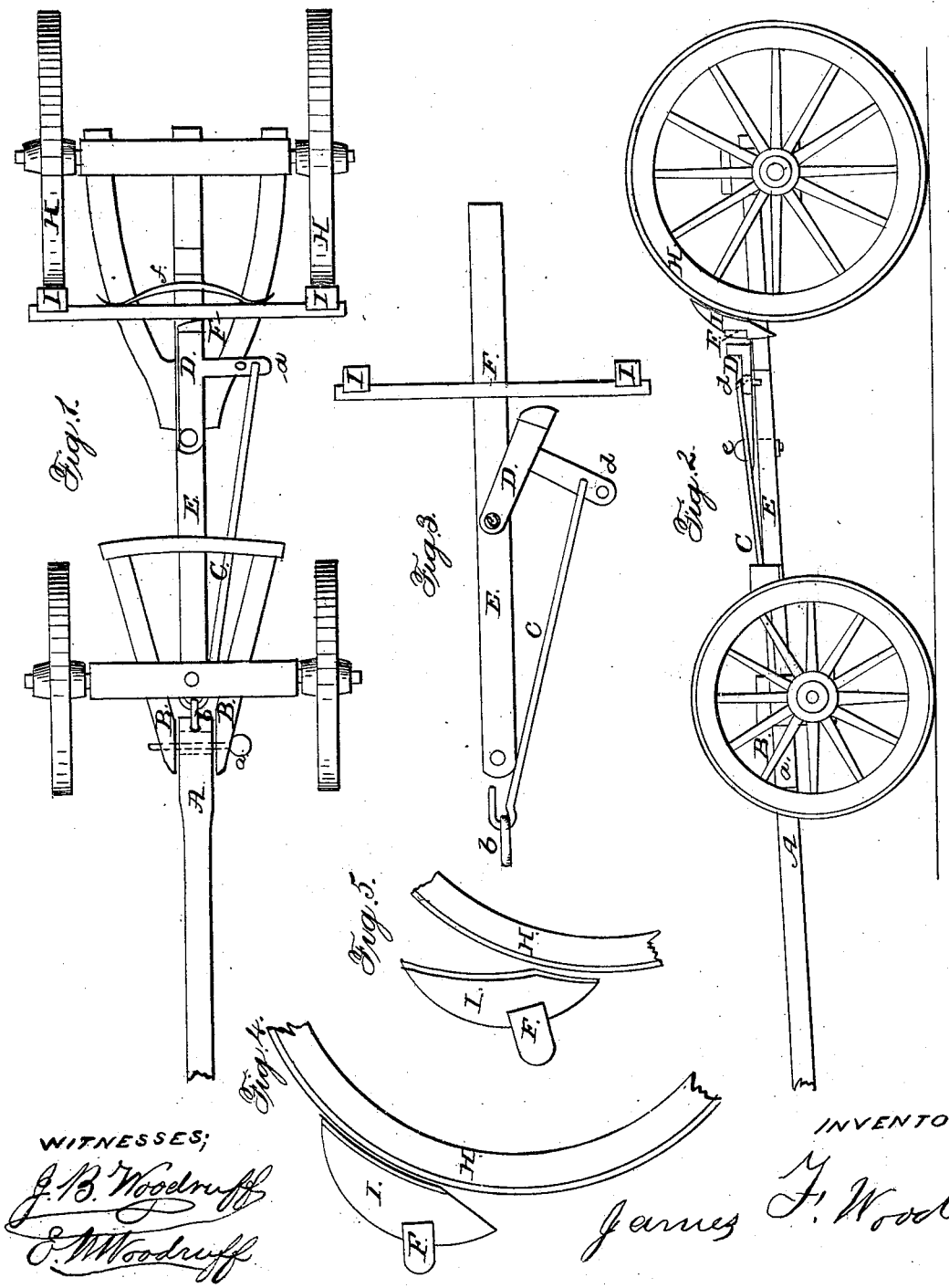

UNITED STATES PATENT OFFICE.

JAMES F. WOOD, 2D, OF COHOCTON, NEW YORK.

IMPROVEMENT IN WAGON-BRAKES.

Specification forming part of Letters Patent No. 42,711, dated May 10, 1864.

*To all whom it may concern:*

Be it known that I, JAMES F. WOOD, 2d, of the town of Cohocton, in the county of Steuben, in the State of New York, have invented certain new and useful Improvements in Self Acting Wagon-Brakes; and the following is a full, clear, and exact description of the same, reference being had to the accompanying drawings, making a part of this specification, in which—

Figure 1 represents a plan or top view of the running-gear of a wagon. Fig. 2 shows a side elevation of the same. Fig. 3 represents the parts of my invention in connection with the wagon-reach, detached. Fig. 4 shows the brake-block on a broken off section of a wagon-wheel when operating. Fig. 5 shows the same view when bracking the wagon up with the brake on the wheel.

The object of my invention is to produce the most simple, cheap, and efficient self-acting wagon-brake, such as will hold the wheels firmly in their forward motion when going down a grade, and also allow them to turn freely when the wagon is backed up by the team.

My invention consists in the application and use of a straight lever with a right-angle arm, the lever being pivoted to the wagon-reach so as to move in the arc of a circle.

To enable others skilled in the art to make and use my improved self-acting wagon-brake, I will describe it more fully, referring to the drawings, and to the letters marked thereon.

My invention is so simple and consists of so few pieces that it can readily be attached to any wagon—transportation, army, or any two or four wheel vehicle—no alteration of any part being required other than to elongate the hole in the wagon-pole A, where the pin or bolt *a* goes through it to secure it to the hounds B B, so as to allow the pole to move two or three inches laterally on the bolt which fastens it to the wagon. To the rear end of the pole A is attached a link of iron, *b*, into which a rod, C, is coupled, the same passing through between the axle and bolster and connecting with the arm *d* of the lever D, which being pivoted to the reach E by the bolt *e*, so that when the pole A is started forward, or there is any draft on the wagon, the connecting-rod C will draw the lever D round and relieve the pressure on the rocking bar F, by which, by the action of the spring *f* against its rear side, the brake-blocks I I, which are made to bear against the periphery of the wheels H, are instantly relieved, the brake-blocks being so made as to conform to the curve of the wheels, the lower portion of which is open, leaving a space so as to allow them to change their position by the action of the wheels turning backward, thus relieving them of any friction while the team is backing the wagon up. The lever D being placed in a direct line with the reach E, when forced in place by the forward motion of the wagon descending an incline, the end of the lever bears centrally on the front of the rocking brake-bar F, and thus equalizes the pressure of the friction-blocks I I upon both the wheels, and when the lever D is set against the bar F it will retain its position until it is relieved by the forward movement of the pole A, and should any part of the gear or harness break, or the team become detached while the wagon or load is bearing on the brake, it will still retain its hold; but as soon as the wagon is started back the brake-blocks I I change their position on the wheels H H by rolling the bar up, and the wheels are at once relieved from the friction, and roll in that direction freely, although the lever D is still in its position against the bar F, for operating the brake, and when the vehicle is started forward the brakes will immediately resume their position and hold the wheels. Thus it will be seen that by my simple arrangement and combination the action of the wagon alone operates the brake when the gravity is pressing forward, as in descending a hill, but is not in the least effected when the motion of the wheels are reversed, as in backing up, the lever D being in the same position in both cases, and presses the brake-blocks against the periphery of the wheels; but owing to their shape and the mode of applying them they will change their position by reversing the motion of the wheels, and thus produce the above-named results.

The advantages of my improvement are that the whole apparatus consists of only few pieces, and can be readily put into any vehicle that has a nep or pole, without any material alteration of any of its parts, and the effect of its operation is sure and certain at all times and in all places where a brake on a wagon is required in heavy transportation over country roads, which in many sections are hilly and the grade often very steep for short distances, with undulating bars of earth across the road at intervals, for the purpose of turning water. My brake is instantly thrown on o off the wheels, just as the pressure of the load is forward or back, so that as soon as the team and wagon begin to descend a grade, and the gravity of the load presses it forward, the brake is sure to be operating, and when the wagon comes into a hollow, and a draft of the team is necessary to bring it over the bar, then, at the instant, the brake is relieved, and continues so until the forward pressure of the load throws it into action again, thus relieving in a great degree the strain upon the harness, both in drawing and holding back the load, as also preventing the sudden jerking of the team, and thereby lightening their labor.

Having thus fully described my invention and its practical operation, what I claim as new and useful, and desire to secure by Letters Patent, is—

The application of the straight lever D with its right-angle arm $d$, the same being pivoted to the wagon-reach and operating in the arc of a circle, in the manner as described, for the purposes herein set forth.

JAMES F. WOOD, 2D.

Witnesses:
 J. B. WOODRUFF,
 E. W. WOODRUFF.